United States Patent [19]

Khare

[11] 4,366,130

[45] Dec. 28, 1982

[54] PROCESS FOR REMOVING RESIDUAL HYDRAZINE FROM CAUSTIC SOLUTIONS

[75] Inventor: Gyaneshwari P. Khare, Wichita, Kans.

[73] Assignee: Vulcan Materials Company, Birmingham, Ala.

[21] Appl. No.: 251,080

[22] Filed: Apr. 6, 1981

Related U.S. Application Data

[63] Continuation-in-part of Ser. No. 172,703, Jul. 25, 1980, Pat. No. 4,282,178, which is a continuation-in-part of Ser. No. 94,390, Nov. 15, 1979, abandoned.

[51] Int. Cl.$^3$ ............................................. C01D 1/36
[52] U.S. Cl. .................................. 423/201; 423/179; 423/183; 423/641
[58] Field of Search ................ 423/641, 201, 183, 179

[56] References Cited

U.S. PATENT DOCUMENTS

| | | | |
|---|---|---|---|
| 2,207,566 | 7/1940 | Waldeck et al. | 423/201 |
| 2,366,546 | 1/1945 | Nichols | 423/641 |
| 2,771,343 | 11/1956 | Arnold et al. | 423/641 |
| 3,325,251 | 6/1967 | Van den Akker | 423/641 |
| 3,630,674 | 12/1971 | Davidson, Jr. | 423/641 |
| 4,282,178 | 8/1981 | Khare | 423/269 |

FOREIGN PATENT DOCUMENTS

| | | | |
|---|---|---|---|
| 2503784 | 8/1976 | Fed. Rep. of Germany | 423/179 |
| 49-45238 | 3/1974 | Japan | 423/641 |
| 49-41278 | 11/1974 | Japan | 423/641 |
| 332250 | 7/1930 | United Kingdom | 423/641 |
| 724439 | 3/1980 | U.S.S.R. | 423/183 |

OTHER PUBLICATIONS

L. F. Audrieth and B. A. Ogg, "The Chemistry of Hydrazine", John Wiley & Sons, Inc., New York, N.Y., 1951, pp. 129-133.

Primary Examiner—O. R. Vertiz
Assistant Examiner—Wayne A. Langel
Attorney, Agent, or Firm—Burns, Doane, Swecker & Mathis

[57] ABSTRACT

In a process for manufacturing food-grade caustic such as sodium hydroxide wherein hydrazine or a derivative or salt thereof is used as a corrosion inhibitor, residual hydrazine is removed from the concentrated caustic product solution by oxidation. The oxidation of residual hydrazine is accomplished by adding to the hydrazine-containing concentrated caustic solution, which is characterized by a pH of 14 or higher, a 5- to 10-fold stoichiometric excess of hydrogen peroxide or an equivalent peroxy compound or hypochlorite.

7 Claims, 1 Drawing Figure

PROCESS FOR REMOVING RESIDUAL HYDRAZINE FROM CAUSTIC SOLUTIONS

RELATED APPLICATIONS

This application is a continuation-in-part of application Ser. No. 172,703 filed July 25, 1980, now U.S. Pat. No. 4,282,178, which in turn is a continuation-in-part of application Ser. No. 94,390 filed Nov. 15, 1979, and subsequently abandoned.

BACKGROUND OF THE INVENTION

This invention relates to the manufacture of caustic and is an improvement in the process disclosed and claimed in parent U.S. Pat. No. 4,282,178, the full text of which is hereby incorporated herein by reference. As disclosed in said parent application, hydrazine and its derivatives and salts have been found to act as surprisingly effective corrosion inhibitors in very small concentrations when concentrated caustic solutions are made by dehydrating relatively weak solutions at a temperature between about 100° and 175° C. Such dehydration is commonly carried out in vessels made of nickel or nickel-containing alloys, which tend to be severely corroded by chlorate-containing caustic solutions unless a proper corrosion inhibitor is used.

While hydrazine compounds have been found to be unusually effective corrosion inhibitors in such a process, as described in said parent application, a small amount of residual hydrazine might be found in the resulting caustic product. This is generally considered harmless for most uses, but even a small residue of a hydrazine compound in the caustic solution can disqualify the latter from use in the food, cosmetic and pharmaceutical industries according to current government laws and regulations.

It has now been discovered that any such hydrazine residues can be effectively destroyed in the dehydrated caustic solution by treating the latter promptly after dehydration with a suitable amount of hydrogen peroxide or a similar suitable per-oxygen compound or with hypochlorite, as is more fully described below. Other more or less common oxidizing agents, for instance, molecular oxygen, air, permanganates, chromates or dichromates, are not practical because of the slow action of molecular oxygen or air under the conditions prevailing in the dehydration process after the evaporation steps, or because, in the case of the named salts, they impart color to the desired product or are themselves toxic, or because of a combination of such effects.

The reaction between hydrogen peroxide and hydrazine is, as such, well known in the art and has been the basis since many years ago for the use of hydrogen peroxide-hydrazine combinations as a fuel for rocket engines or high-altitude missiles. For instance, it has been reported that the Germans toward the end of World War II used as a rocket fuel an 80 percent solution of hydrogen peroxide with a mixture consisting of 30 percent hydrazine hydrate, 57 percent methyl alcohol, 13 percent water and 0.11 percent potassium cuprocyanide as a catalyst. See L. F. Audrieth and B. A. Ogg, "The Chemistry of Hydrazine," John Wiley & Sons, Inc., New York, N.Y., 1951, page 129. However, as also reported in the same reference (p.131), the reaction rate between hydrogen peroxide and hydrazine in dilute aqueous solutions was found in academic studies to be strongly affected by variations in the pH of the solutions and to rise sharply to a maximum at a pH of 10, with sharp drop-offs at both higher and lower pH values.

The present discovery of the effectiveness of hydrogen peroxide as a scavenger for traces of hydrazine in concentrated caustic solutions, i.e., in caustic solutions having a pH of at least 14 and ordinarily well above 14, is accordingly thus entirely surprising and contrary to what the prior art might lead one to expect.

OBJECTS OF THE INVENTION

It is an object of this invention to insure physiologically safe alkali metal hydroxide solutions that are characterized by low corrosivity with respect to nickel or nickel alloy surfaces and by freedom from toxic residues.

It is another object of this invention to provide an improved process for manufacturing caustic soda solutions wherein the corrosive effect of aqueous caustic liquors on processing equipment constructed of nickel or nickel alloys is reduced by the addition of a hydrazine compound and yet a concentrated caustic soda solution is produced that is free of any chemical residue that could disqualify it from use in the food, cosmetic or pharmaceutical industries.

Still another object is to provide an improved process for the manufacture of food-grade caustic from caustic liquors containing a hydrazine compound as a contaminant.

It is further an object of this invention to provide a process for concentrating dilute alkali metal hydroxide solutions to a high degree, even to practically complete dehydration, by evaporation in nickel or nickel-containing equipment using a hydrazine compound as a corrosion inhibitor and by subsequently removing any objectionable hydrazine residues from the concentrated solutions so as to make them meet food-grade specifications.

Still more particularly it is among the objects of this invention to provide an improved process for the production of food-grade concentrated caustic soda solutions from soda solutions such as those produced in an electrolytic cell wherein a chlorate-containing dilute soda solution is dehydrated by evaporation at elevated temperatures after addition of a hydrazine compound as a corrosion inhibitor, and particularly by evaporation in evaporators having inner surfaces composed of nickel of a nickel alloy, and wherein potentially objectionable residues of such a corrosion inhibitor are destroyed in the process by reaction with a suitable oxidizing agent prior to final filtration of the hot caustic solution.

A still further object is to provide an improved process for reducing the corrosion normally encountered when relatively dilute sodium hydroxide solutions containing sodium chlorate as an impurity are evaporated at elevated temperatures in contact with a nickel-containing metal surface in multiple effect evaporators, which process is economical in terms of corrosion inhibitor required, does not depend on the substantially complete removal of the chlorate from the solution, is operative in the absence of any added iron or other catalyst, and in the end allows the production of food-grade caustic that is free from any objectionable additive.

SUMMARY OF THE INVENTION

It should be understood that the term "caustic" in the sense used herein comprises solutions of sodium hydroxide or potassium hydroxide.

It should further be understood that, in the absence of an explicit indication to the contrary, amounts and proportions of materials are expressed on a weight basis throughout this specification and appended claims.

In accordance with one of its aspects, the present invention provides for the dehydration of an aqueous caustic solution comprising a corrosion-inhibiting amount of hydrazine, or an inorganic or organic derivative thereof, or a mixture comprising a plurality of such compounds, and the subsequent destruction of any objectionable hydrazine residues in the process subsequent to the dehydration and prior to or in the course of the final cooling of the resulting concentrated caustic having a pH of at least 14. More particularly, the hydrazine compound may be added to the caustic solution in an amount equal to between about 1% and about 100% or more, but preferably between about 3% and not more than about 50%, of the stoichiometric amount required for a substantially complete reduction of any chlorate present to chloride, and residual hydrazine is then destroyed in the concentrated solution at a pH of at least 14 by reaction with a suitable added peroxygen compound or with hypochlorite prior to or in the course of the final cooling of the resulting concentrated solution.

Thus, for instance, the invention provides for adding about 2 to 1000 ppm, preferably about 2 to 200 ppm, and most preferably about 3 to about 40 ppm hydrazine, or an equivalent amount of one of its said derivatives, to the dilute, chlorate-containing caustic solution to serve as a corrosion inhibitor in the dehydration; and then adding hydrogen peroxide or other physiologically acceptable peroxygen compound or hypochlorite to the resulting hot, concentrated caustic solution in an amount sufficient to destroy any objectionable hydrazine residues therein.

Although it may be helpful to add the hydrazine compound to the caustic solution in a somewhat greater concentration within the stated range when a relatively high proportion of chlorate is present than when its proportion is very low, it is to be emphasized that the use of 50% or less e.g., 1 to 25% of the stoichiometric proportion of the hydrazine compound is generally sufficient to provide effective corrosion protection, as stated above. The amount of hydrazine compound required for effective corrosion protection in any given case depends not only on the concentration of chlorate present in the caustic solution, but to some extent also on such other factors as the presence of other oxidants, processing temperature, and flow rate of the solution along the corrodible surfaces. The chlorate content of caustic soda solutions is, of course, routinely determined by standard analytical procedures, and the optimum amount of hydrazine compound to be added is readily determined for any given case by routine preliminary tests.

In accordance with a particular embodiment, this invention provides for the dehydration of an aqueous caustic soda solution that has low corrosiveness toward metals such as nickel, which solution comprises about 25% or more, e.g., between 35 and 75% sodium hydroxide, sodium chlorate as an impurity in a concentration of about 1% or less, e.g., 0.02% to 1%, commonly about 0.03 to 0.15%, and about 2 to about 1,000 ppm, preferably 3 to 40 ppm, hydrazine or an equivalent amount of hydrazine derivative as a corrosion inhibitor, and for the production of food-grade caustic therefrom by the destruction of any residual hydrazine therein.

In another aspect, the invention provides an improved method for dehydrating chlorate-contaminated aqueous caustic soda solutions at an elevated temperature in contact with a metal surface composed essentially or predominantly of nickel, wherein hydrazine or an equivalent amount of an inorganic or organic derivative thereof is added to the solution as a corrosion inhibitor in an effective amount equal to from about 1% to 25%, of the stoichiometric amount relative to the chlorate present in the solution, e.g., in an amount between about 2 and about 200 ppm based on the weight of the caustic solution, and in the absence of any added oxidation-reduction catalyst, and wherein any objectionable hydrazine residues are destroyed by oxidizing such residues in the concentrated solution prior to or in the course of the final cooling of same by means of an added peroxygen compound or hypochlorite.

While hydrazine itself, $N_2H_4$, is currently preferred for the purposes of this invention, its hydrate, $N_2H_4.H_2O$, and its various salts of strong inorganic acids such as hydrazine hydrochloride, hydrazine sulfate, hydrazine phosphate, etc., may be used likewise. Moreover, organic derivatives of hydrazine may also be used, but are less preferred because they tend to be less effective than the inorganic compounds in a strongly alkaline environment. Representative organic hydrazine derivatives include those disclosed in U.S. Pat. No. 3,962,113, e.g., alkyl hydrazines having a single alkyl group of 1 to about 10 carbon atoms, or dialkyl hydrazines wherein each alkyl contains from 1 to about 8 carbon atoms; and their associated inorganic acid salts may be used in a like manner.

The present invention is based at least in one part on the surprising discovery that in the case of hydrazine and its equivalent derivatives the corrosion inhibiting action does not depend on the elimination of the chlorate impurity from the caustic liquor by direct chemical reaction, and that consequently a surprisingly small proportion of inhibitor, substantially less than the stoichiometric amount in relation to any chlorate present, can be used in practicing the present invention, and in another part on the discovery that any objectionable residues of such inhibitor can consequently be removed from the final strong caustic solution by reaction with a relatively small amount of hydrogen peroxide or other suitable peroxy compound or hypochlorite.

More particularly, to remove any unreacted hydrazine from the dehydrated caustic solution, or to make certain that no significant amount of such hydrazine remains in the finished product, according to the present improvement there is added to the freshly dehydrated caustic solution a peroxide or other suitable peroxy compound or hypochlorite. Hydrogen peroxide and sodium peroxide are particularly preferred in the manufacture of caustic soda because they leave no foreign residue in the caustic soda product. However, also useful are the peroxides of nontoxic monovalent or divalent metals, e.g., peroxides of potassium, calcium, magnesium or zinc; peroxy acids and their water soluble salts of the mono- or divalent metals named above, e.g., peroxy sulfuric acid, peroxy acetic acid, peroxy phosphoric acid, and their respective alkali metal, calcium, magnesium or zinc salts, as well as sodium perborate, sodium percarbonate, and the like, i.e., salts which upon dissolution in water produce hydrogen peroxide or a similar species in solution. Organic peroxides such as benzoyl or cumeme peroxide also oxidize hydrazine, but are not particularly desirable for the purposes of this invention because they introduce a potentially objectionable organic contaminant into the product.

In the case of hydrogen peroxide, commercially available aqueous solutions containing 3% and up to 70% or more $H_2O_2$ can be used, but solutions containing about from about 25 to 50% $H_2O_2$ are preferred. Commercially available hydrogen peroxide solutions containing about 35% $H_2O_2$ are particularly convenient to use. In the case of solid peroxy compounds, these are best used in the form of aqueous solutions because of ease of accurately metering such solutions so as to furnish the predetermined small amounts of the oxidant to the caustic solution.

Hypochlorous acid can be added as such in the form of a weak aqueous solution, or it can be added as an aqueous solution of sodium hypochlorite or a similar non-toxic salt thereof, or hypochlorite can be formed in situ by bubbling suitable small amounts of chlorine gas into the concentrated sodium hydroxide solution, e.g., an aqueous solution containing 40 to 50% NaOH. The chlorine forms sodium hypochlorite in such solution according to the equation $$Cl_2 + 2NaOH \rightarrow NaOCl + NaCl + H_2O.$$

When hydrogen peroxide is used as the oxidant, it reacts with residual hydrazine according to the equation $$N_2H_4 + 2H_2O_2 \rightarrow N_2 + 4H_2O$$

When sodium hypochlorite is used as the oxidant, it reacts with residual hydrazine according to the equation $$N_2H_4 + 2NaOCl \rightarrow N_2 + 2NaCl + 2H_2O$$

Under normal operation, the amount of residual hydrazine left in the concentrated caustic solution after the dehydration step is less than 5 parts per billion and is therefore undetectable by commonly available colorimetric analysis using p-dimethylaminobenzaldehyde as reagent, which is incapable of detecting concentrations below about 5 parts per billion. However, there may be unanticipated circumstances when residual hydrazine may be present in the concentrated caustic solution in measurable concentrations, e.g., 50 ppb or up to as much as 200 ppb or even 1 ppm depending on the amount of hydrazine initially added and the proportion thereof subsequently consumed in the process. In any event, it is advisable to monitor the concentration of residual hydrazine by regular, periodic analysis and to add hydrogen peroxide or other equivalent oxidant to the process in stoichiometric excess over the amount required to destroy the residual hydrazine determined as being present.

In order to insure destruction of residual hydrazine within a practical time, e.g., $\frac{1}{2}$ to 5 hours, it is desirable to add about 1.2 to about 15 times, preferably about 5 to 12 times the stoichiometric amount of oxidant required. With a 10-fold excess of oxidant the residual hydrazine can be destroyed in less than one hour. When no measurable amount of residual hydrazine is detected, i.e., when residual hydrazine concentration in the concentrated caustic solution is less than 5 parts per billion, the addition of 0.2 to 5 ppm $H_2O_2$, preferably about 1 ppm $H_2O_2$, should suffice. If the caustic contains 1 ppm $N_2H_4$, 21 ppm $H_2O_2$ will be required if it is desired to provide a 10-fold stoichiometric excess. Thus, according to this invention it is advisable to add $H_2O_2$ or equivalent oxidant to the concentrated caustic solution at a rate of between about 1 and about 25 ppm or more, depending on the concentration of residual hydrazine present and the rate of reaction desired. Laboratory studies have shown that if a 10-fold stoichiometric excess of $H_2O_2$ relative to $N_2H_4$ is used, the half-life of the reaction between these two compounds ($N_2H_4 + 2H_2O_2 \rightarrow N_2 + 4H_2O$) in reagent grade caustic soda solution is approximately four minutes and thus represents an unusually cost-effective method for removing residual hydrazine.

The hydrazine oxidation can be carried out at about 20°–75° C., the preferred temperature range being 30°–50° C. As the temperature of reaction is increased above 75° C., the hydrogen peroxide tends to decompose at an increasing rate and thus becomes less efficient in acting on the hydrazine.

If technical grade 50% caustic solution, such as the concentrated caustic soda solution obtained in the commercial diaphragm cell process described herein, is the medium in which hydrazine is being destroyed by hydrogen peroxide, the destruction of the hydrazine proceeds 5–10 times faster than when the reaction is conducted in a comparable solution of reagent grade caustic, probably because of a catalytic effect of metal contaminants that are normally present in such technical grade caustic.

The present invention involving the use of a hydrazine compound as a corrosion inhibitor is useful whenever a solution containing sodium or potassium hydroxide contaminated with chlorate as an impurity is treated in contact with a metal surface composed of nickel or a nickel-iron alloy wherein nickel forms a major constituent, or stainless steel, which is commonly used in caustic service. It is particularly useful when a chlorate-containing aqueous caustic liquor must be maintained in contact with the nickel, nickel alloy or stainless steel surface at a temperature above 100° C., and particularly at a temperature between about 130° and 175° C.

The newly disclosed improvement is of particular value in the manufacture of food-grade concentrated caustic soda solutions wherein a relatively dilute solution, for instance, a solution produced in a diaphragm cell, is evaporated in several consecutive stages at consecutively higher temperatures to produce a concentrated solution containing at least 40 percent sodium hydroxide, especially solutions containing 48 to 75 percent or more sodium hydroxide. According to the invention, such solutions are preferably made by dehydration in the presence of a corrosion inhibitor, e.g., hydrazine, in triple or quadruple effect evaporators that are constructed of nickel metal or high nickel content alloys or of steel having an inner cladding of nickel or nickel alloy, although heat exchanger tubes in such systems are also commonly made of CA type stainless steel, e.g., E-Brite 26-1 manufactured by Trent Tube Division, Colt Industries. When multiple stage evaporation is used, all of the required corrosion inhibitor may be added in or ahead of the final evaporation stage, or the inhibitor may be added separately to each evaporation stage, in which event it may be preferred to add none or only a small proportion of the total corrosion inhibitor to the evaporation stage or stages that operate at temperatures below about 60° C., and to add the required amount of inhibitor principally or exclusively to the stage or stages that operate at temperatures above about 60° C.

According to the new improvement, hydrogen peroxide or other selected oxidant is introduced into the dehydrated caustic solution in the process at the proper rate by any convenient means such as a proportioning pump. A convenient place for such introduction is a cooling tank or other vessel or line in the system wherein the freshly dehydrated caustic solution is essentially at a temperature below about 75° C., e.g., between about 20° and 70° C.

While the invention is described in the specification principally in connection with the manufacture of concentrated caustic soda solutions based on the diaphragm cell process, it is similarly applicable to caustic alkali solutions from other processes, e.g., from membrane cells, mercury cells or from the lime-soda process, or to any chemical processes wherein a strongly alkaline, chlorate-containing alkali solution is maintained in contact with processing equipment having nickel or nickel-containing surfaces.

THE DRAWING

FIG. 1 of the drawing is a schematic flow diagram of the relevant portion of a plant wherein a weak caustic solution is concentrated in a quadruple effect evaporation system to produce a commercially useful concentrated caustic soda product, as previously described in applicant's parent application Ser. No. 172,703, now U.S. Pat. No. 4,282,178.

FIG. 2 is a schematic diagram showing further a further portion of such a plant wherein the freshly dehydrated caustic soda solution is cooled, treated with hydrogen peroxide or the like to insure destruction of residual hydrazine, filtered and passed to storage.

DETAILED DESCRIPTION OF THE INVENTION

As the invention is of particular value in connection with the manufacture of concentrated caustic soda solutions, a representative embodiment of such a manufacture will now be described in detail in connection with a diaphragm cell process for purposes of illustration.

Only about one-half of the sodium chloride in the feed brine to a diaphragm cell is electrolytically converted. The cell liquor is a composite of the unconverted sodium chloride brine, the electrolytically produced sodium hydroxide, any sodium sulfate impurity present in the cell feed, minor amounts of decomposition products such as sodium chlorate and sodium hypochlorite, and water. The overall caustic system typically performs the three-fold function of (a) concentrating the caustic to a commercial 50 weight percent concentration, (b) recovering the sodium chloride for recycle to the cells, and (c) purging sulfate from the overall chlor-alkali operation.

Figure 1:
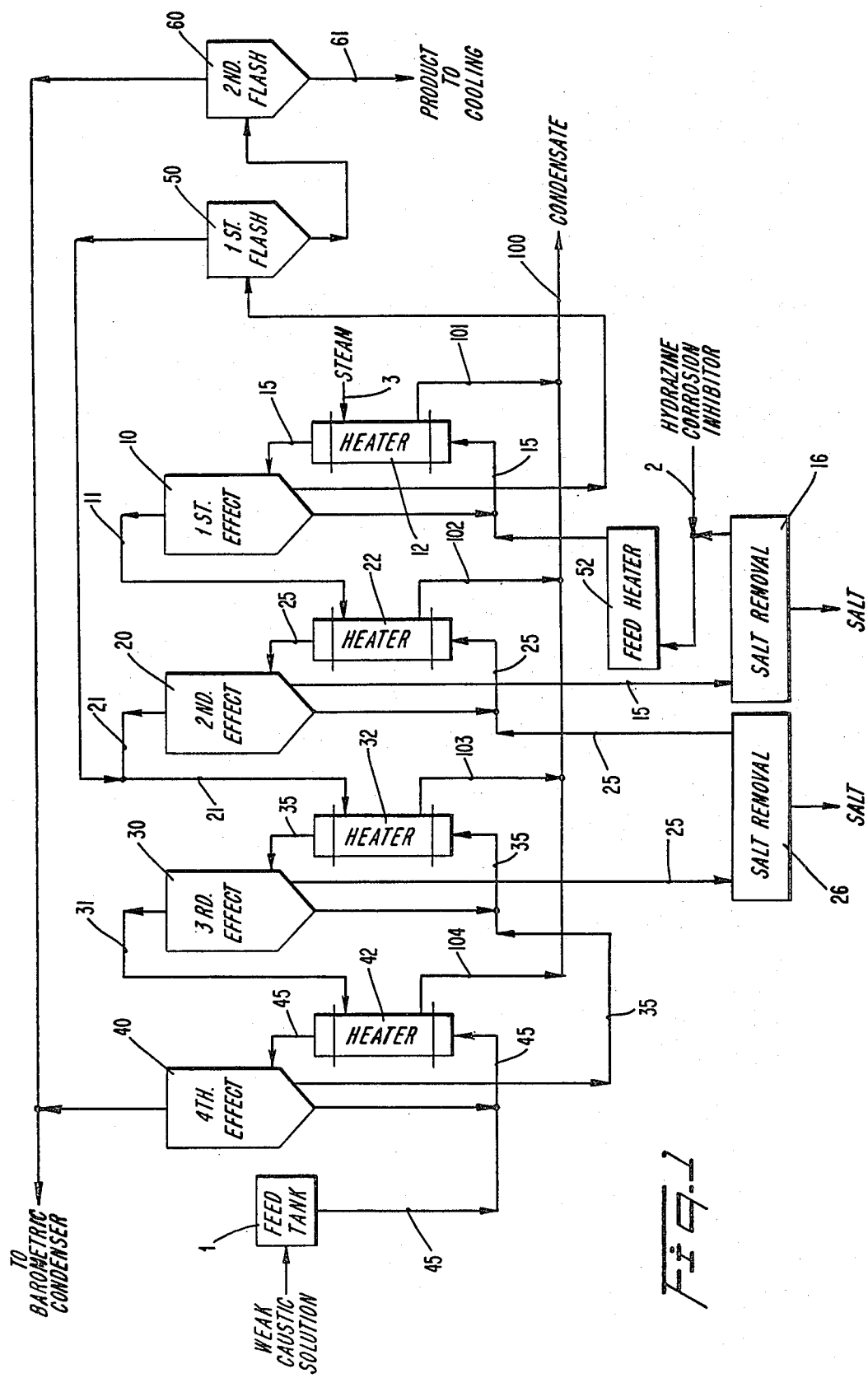

Concentration of the caustic has conventionally been done in three steps or effects. With greater emphasis on energy conservation newer plants are being designed featuring quadruple effect evaporation systems, as illustrated in the drawing. Referring to FIG. 1, a weak caustic solution such as the cell liquor from a diaphragm cell process (not shown) is fed from feed tank 1 to the fourth effect 40, concentrated and sent to the third effect 30, where it is concentrated further and sent to the second effect 20 and subsequently to the first effect 10, with further concentration being obtained in each effect. Differing orders of progression between effects are sometimes employed. Two liquor flash effects 50 and 60 are incorporated as part of the basic system for the purpose of partially cooling and further concentrating the hot caustic liquor by flash evaporating to lower pressure and temperature prior to discharging via line 61 to a final cooling and filtering system, which is further illustrated in FIG. 2.

Steam introduced via line 3 is used as the primary heat source in the first effect. Vapors evaporated from the first effect 10 are then withdrawn via line 11 and used as the heat source in the second effect 20. Similarly the second effect vapors are passed via line 21 to the third effect 30 where they are used as a heat source. The third effect vapors are in turn removed via line 31 and used in the fourth effect 40. A natural balance of pressures and temperatures occurs between effects, dependent upon progressive concentration of the caustic liquors in each effect.

Heaters 12, 22, 32 and 42 are used as a means for using extraneous steam or the vapors produced in the process to preheat the caustic solutions that are fed into the effeccts 10, 20, 30 and 40, via caustic lines 15, 25, 35 and 45, respectively. Steam condensate is withdrawn from the process via lines 100, 101, 102, 103 and 104, while sodium chloride removal is effected in stages 26 and 16.

While the quadruple effect evaporating system is highly efficient with respect to energy, the system usually requires higher process temperatures (about 130° to 180° C., e.g., 160° to 175° C.) in the more concentrated evaporative stage. It is primarily in this temperature range and at this point in the process that corrosion problems are most persistent and troublesome. In the system illustrated in FIG. 1, all of the hydrazine corrosion inhibitor is therefore shown as being introduced via line 2 into the caustic solution from the second effect 20 before it is further heated in heater 52 and before it is introduced into the first effect 10. However, as mentioned before, one can introduce the inhibitor portionwise at various stages of the process.

Figure 2:
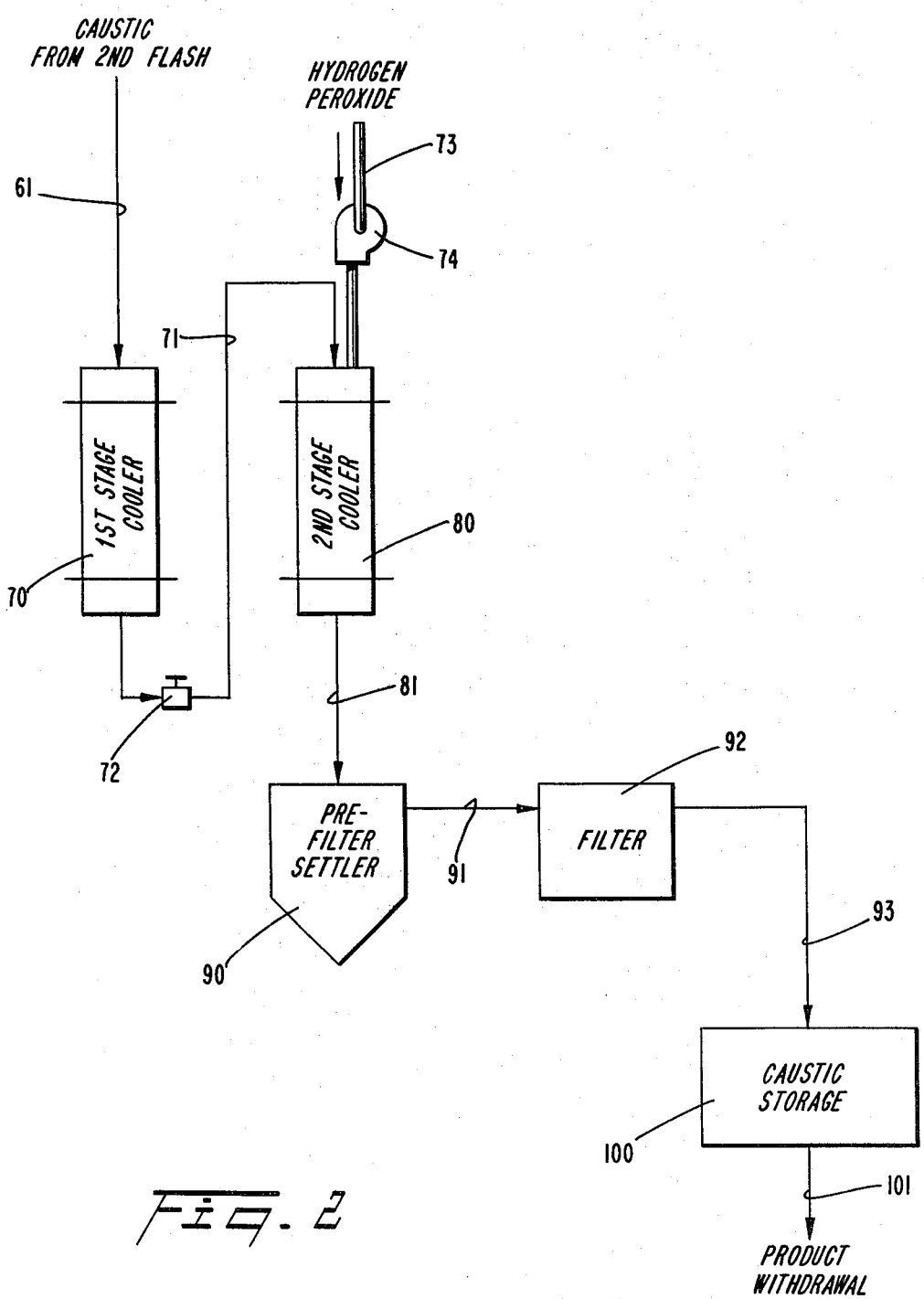

Referring to FIG. 2, line 61 represents the discharge line through which freshly concentrated caustic solution is withdrawn from the second flash effect 60, as illustrated in FIG. 1, and passed to a final cooling and filtering system prior to storage. The temperature of the caustic solution in line 61 typically is in the range of from about 85° to about 115° C. before it is introduced into a first-stage cooler 70 and then via line 71 into a second-stage cooler 80. Coolers 70 and 80 are provided with conventional stirrers (not shown) that serve to provide continuous agitation for the liquid contents of the coolers. In cooler 70 the temperatures typically range from about 35° to about 115° C. and in cooler 80 the temperatures range from about 20° to about 70° C., e.g., between ambient temperature and about 65° C.

The hydrazine content of the concentrated caustic solution, e.g., a 50% caustic solution, is monitored on a regular basis by withdrawing samples of the solution at perodic intervals via tap 72 and analyzing them. Hydrogen peroxide or other selected fluid oxidant is preferably introduced into the system at a place where the temperature of the caustic solution is at a temperature of 75° C. or less. For instance, as shown in FIG. 2, aqueous hydrogen peroxide solution containing 35% $H_2O_2$ is introduced into cooler 80 via line 73 and proportioning pump 74. However, depending on the temperatures prevailing in various parts of particular plant, the oxidant may be introduced ahead of cooler 80, e.g., into cooler 70, or downstream from cooler 80, e.g., into the pre-filter settler 90.

If hypochlorite formed in situ is to be used to destroy residual hydrazine, chlorine gas may be piped into the agitated cooler 80 via line 73 at the proper rate.

After cooling, the caustic soda solution is passed to a prefilter settler 90, which may be a conventional gravity clarifier or a centrifugal settler, and then finally filtered in filter 92 before being passed to product storage tank 100. Filter 92 may be of any suitable variety, such as a porous media filter of the gravity type, a pressure tube filter, or a pressure leaf filter, as is otherwise conventional in the manufacture of caustic soda. The solids removed are primarily sodium chloride, sodium sulfate and insoluble metal hydroxide.

EXAMPLES

The effectiveness of the invention is illustrated by the tests described below.

EXAMPLE 1

A 50% caustic soda solution was prepared from analytical reagent grade sodium hydroxide pellets and distilled water. Various amounts of hydrazine were dissolved in aliquot portions of this solution and resulting test solutions treated by adding thereto various proportions of aqueous hydrogen peroxide (35% $H_2O_2$) at $32 \pm 0.5°$ C. and mixing. Hydrazine reacts with hydrogen peroxide according to the equation $N_2H_4 + 2H_2O_2 \rightarrow N_2 + 4H_2O$. Progress of the reaction was followed by determining the hydrazine concentration in the test solutions at various intervals. The residual hydrazine concentration was determined colorimetrically using p-dimethylaminobenzaldehyde as reagent.

In test run 1, a 100 g sample of caustic solution containing 5.0 ppm added hydrazine was used. The stoichiometric amount, i.e., 10.6 ppm, of $H_2O_2$ in the form of the 35% solution was added to this hydrazine-containing caustic solution and the hydrazine concentration in 10 g aliquots was measured at intervals over the next 27 hours. The results are shown in Table I. As can be seen from these results, it took about 5 hours for 50 percent decay of the hydrazine to occur and about 27 hours for 96.4 percent decay of the hydrazine to occur.

Since the reaction was rapid a special technique was used in test run 2. Thus one 10 g sample of caustic solution containing 2.110 ppm added hydrazine was used for each data point. 42.5 ppm $H_2O_2$, i.e., approximately ten times the stoichiometric amount was added to the test sample. At the end of the required time, the reaction was quenched by adding the reagent to the test solution and its hydrazine content was measured, with the results shown in the second part of Table I. In this test, hydrazine destruction was far more rapid than in test run 1, 99.8 percent reduction in hydrazine concentration being effected in less than 40 minutes.

TABLE I

Destruction of Hydrazine by Hydrogen Peroxide in 50% Sodium Hydroxide Solution (Reagent Grade)

| Time, Min. | Hydrazine Conc., ppm |
|---|---|
| Test Run 1 | |
| Temperature $32 \pm 0.5°$ C., $H_2O_2$ = 10.6 ppm | |
| 0 | 5.0 |
| 64 | 4.89 |
| 184 | 2.86 |
| 309 | 2.47 |
| 1629 | 0.18 |
| Test Run 2 | |
| Temperature $32 \pm 0.5°$ C., $H_2O_2$ = 42.5 ppm | |
| 0 | 2.110 |

TABLE I-continued

Destruction of Hydrazine by Hydrogen Peroxide in 50% Sodium Hydroxide Solution (Reagent Grade)

| Time, Min. | Hydrazine Conc., ppm |
|---|---|
| 3 | 0.369 |
| 6 | 0.215 |
| 12 | 0.075 |
| 24 | 0.024 |
| 36 | <0.005 |

EXAMPLE 2

Similar tests were made using technical grade 50% caustic soda solution, i.e., a soda solution obtained from a commercial plant of the kind described earlier herein. In this test, a 100 g sample of the caustic solution containing 1 ppm added hydrazine was used. To this 2.6 ppm of $H_2O_2$ (35% solution) was added, which proportion is equivalent to about 1.2 times the stoichiometric amount. As can be seen from Table II, 89 percent reduction in hydrazine concentration was attained in five hours despite the relatively slight excess of hydrogen peroxide added. From a comparison with test run 1, it is apparent that the hydrazine oxidation proceeds at a rate several times greater in the technical grade caustic solution than in the reagent grade caustic solution, probably because of the somewhat greater concentration of metal contaminants such as iron and nickel that are normally found in such technical grade caustic than in reagent grade caustic.

TABLE II

Destruction of Hydrazine by Hydrogen Peroxide in 50% Technical Sodium Hydroxide

Test Run 3
Temperature $32 \pm 0.5°$ C., $H_2O_2$ = 2.6 ppm

| Time, Min. | Hydrazine Conc., ppm |
|---|---|
| 0 | 1.0 |
| 60 | 0.31 |
| 180 | 0.16 |
| 300 | 0.11 |

COMPARATIVE TEST USING OXYGEN GAS

Another series of tests was conducted using molecular oxygen gas as an oxidant. In one such test (run 4), 0.99 ppm hydrazine was added to a 100 g sample of 50% caustic soda (reagent grade) solution; in the other test (run 5), 5.80 ppm hydrazine was added to another 100 g sample of the same caustic soda solution. In each case, gaseous oxygen was slowly injected from an oxygen cylinder into the hydrazine-containing caustic solutions, which were maintained at $32 \pm 0.5°$ C. and 10 g aliquots were periodically analyzed. The results are shown in Table III.

TABLE III

Destruction of Hydrazine in 50% Caustic by Molecular Oxygen at 32° C.

| Time, Min. | Hydrazine Conc., ppm. |
|---|---|
| Test Run 4 | |
| 0 | 0.99 |
| 148 | 0.76 |
| 268 | 0.71 |
| 388 | 0.51 |
| 837 | 0.28 |
| 1807 | 0.02 |
| Test Run 5 | |
| 0 | 5.80 |
| 370 | 5.23 |

TABLE III-continued

Destruction of Hydrazine in 50% Caustic by Molecular Oxygen at 32° C.

| Time, Min. | Hydrazine Conc., ppm. |
|---|---|
| 973 | 4.83 |
| 1373 | 4.05 |
| 1798 | 3.77 |
| 2823 | 2.80 |
| 3223 | 1.89 |

The data show that in test run 4, wherein the caustic contained less than 1 ppm hydrazine, it took about 6.5 hours for the hydrazine content to decay by 50 percent and more than 30 hours to decay by 98 percent. In test run 5, wherein the caustic contained 5.8 ppm hydrazine, the reaction was even slower in that the hydrazine content decayed by only about 35 percent in 30 hours and even after 50 hours more then one-third of the original hydrazine content remained undecomposed. Obviously, the use of molecular oxygen is totally impractical if residual hydrazine concentration in the caustic is several parts per million. By contrast, the use of hydrogen peroxide or similar peroxy compound or of hypochlorite is very effective and speedy, despite indications in the prior art that the required oxidation cannot be effectively carried out in a strongly alkaline aqueous medium.

It is to be understood that the invention which is intended to be protected is not to be construed as being limited to the particular embodiments disclosed, and that these are to be regarded as illustrative rather than limiting. Variations and changes may be made by those skilled in the art without departing from the spirit of the invention claimed.

I claim:

1. In a process for making a concentrated caustic solution containing between about 40% and about 80% sodium or potassium hydroxide by dehydration of a dilute aqueous solution containing between about 10% and about 35% of said hydroxide and chlorate as an impurity, wherein said dehydration is conducted in a plurality of consecutive evaporation stages at consecutively higher temperatures such that at least one of said stages is at a temperature in the range between about 130° and about 175° C. while in contact with a metal surface composed of nickel as a major component and wherein a corrosion-inhibiting amount of hydrazine or an inorganic or organic derivative of hydrazine is added to said caustic solution that is to be evaporated, the improvement which comprises adding to said concentrated caustic solution at least one oxidizing agent selected from the group consisting of hydrogen peroxide, alkali metal peroxides, peroxides or calcium, magnesium and zinc, peroxy sulfuric acid, peroxy acetic acid, peroxy phosphoric acid, perboric acid, percarbonic acid and nontoxic metal salts of any of said acids, and hypochlorites of nontoxic metals, in an amount sufficient to oxidize residual hydrazine remaining in said caustic solution, and mixing the resulting mixture at a pH of at least 14 and at a temperature between about 20° and 75° C. until said residual hydrazine is substantially destroyed.

2. A process according to claim 1 wherein said dilute solution is a sodium hydroxide solution containing from about 0.02 to 1% sodium chlorate, wherein hydrazine is added thereto in a stoichiometric proportion of from about 1% to about 50% relative to the chlorate, and wherein a five- to twelve-fold stoichiometric excess of hydrogen peroxide is added as the oxidizing agent to said concentrated caustic solution after the latter has been dehydrated.

3. A process according to claim 2 wherein said dilute solution is a sodium hydroxide solution from a diaphragm cell containing from about 0.02 to about 1% sodium chlorate, wherein said dehydration is conducted in at least two evaporation stages, wherein said hydrazine or derivative thereof is added to said solution without addition of any reduction-oxidation catalyst, and wherein hydrogen peroxide is added to the resulting dehydrated sodium hydroxide solution in an amount equal to at least 1 ppm and sufficient to destroy residual hydrazine remaining in said dehydrated solution.

4. A process according to claim 3 wherein said dilute solution is a sodium hydroxide solution containing from about 0.03 to 0.15% sodium chlorate, wherein hydrazine is added to said solution in an amount in the range of from about 3 to about 40 ppm, and wherein hydrogen peroxide is added to the dehydrated sodium hydroxide solution subsequent to the last evaporation stage and at a temperature between 30° and 50° C. prior to final cooling of said dehydrated solution.

5. A process according to claim 4 wherein hydrazine is added to said dilute solution at least in part subsequent to the evaporation stage that is operated at the lowest temperature and ahead of any stage that is operated at a temperature of at least 160° C., and wherein the hydrogen peroxide is added to the concentrated caustic solution in an amount equal to at least 1 ppm and corresponding to a five- to ten-fold stoichiometric excess relative to the hydrazine remaining in the concentrated caustic solution.

6. In a process for making concentrated caustic soda wherein a relatively dilute aqueous solution comprising sodium hydroxide, sodium chlorate as an impurity and hydrazine or an equivalent amount of an inorganic or organic derivative of hydrazine as a corrosion inhibitor is concentrated by dehydration at a temperature between about 100° and 175° C. in contact with a metal surface composed in major part of nickel, the improvement which comprises adding to said dehydrated solution an oxidizing compound selected from the group consisting of peroxygen compounds and hypochlorite salts of an alkali or alkaline earth metal in an amount sufficient to react with residual hydrazine remaining in said dehydrated solution, and agitating the resulting mixture at a pH of at least 14 and between about 20° and at a temperature 75° C. until the residual hydrazine is substantially destroyed.

7. A process for removing hydrazine from an aqueous caustic solution characterized by a pH of at least 14 and containing about 40 to 80% sodium hydroxide and from 5 parts per billion to about 5 parts per million hydrazine or an inorganic or organic derivative of hydrazine, which process comprises adding to said solution a five- to ten-fold stoichiometric excess of an oxidant relative to the amount of hydrazine present in the solution, said oxidant being selected from the group consisting of hydrogen peroxide, peroxides of non-toxic mono- or divalent metals, peroxy acids and non-toxic metal salts thereof, and hypochlorites of non-toxic metals and agitating the resulting mixture at a pH of at least 14 and at a temperature between about 20° and 75° C. until the residual hydrazine is destroyed.

* * * * *